United States Patent
O'Malley

(10) Patent No.: US 9,639,677 B1
(45) Date of Patent: May 2, 2017

(54) SKILL-BASED AUTHENTICATION

(71) Applicant: EMC Corporation, Hopkinton, MA (US)

(72) Inventor: Michael J. O'Malley, Lowell, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/587,237

(22) Filed: Dec. 31, 2014

(51) Int. Cl.
*H04L 9/32* (2006.01)
*G06F 21/31* (2013.01)

(52) U.S. Cl.
CPC ................. *G06F 21/31* (2013.01)

(58) Field of Classification Search
None
See application file for complete search history.

(56) References Cited

U.S. PATENT DOCUMENTS

| | | | | |
|---|---|---|---|---|
| 7,640,167 | B2 * | 12/2009 | Ookushi | G06Q 30/02 705/1.1 |
| 8,532,343 | B1 * | 9/2013 | Freedman | G06K 9/00335 382/115 |
| 9,519,766 | B1 * | 12/2016 | Bhosale | G06F 21/31 |
| 2008/0254438 | A1 * | 10/2008 | Woolf | G09B 7/00 434/365 |
| 2008/0261191 | A1 * | 10/2008 | Woolf | G06Q 50/20 434/323 |
| 2009/0182609 | A1 * | 7/2009 | Kelleher | G06Q 10/06311 705/7.14 |
| 2009/0253107 | A1 * | 10/2009 | Marggraff | G09B 11/00 434/162 |
| 2012/0331390 | A1 * | 12/2012 | Kanjirathinkal | G06Q 50/01 715/738 |
| 2013/0074180 | A1 * | 3/2013 | Chim | G06F 21/33 726/18 |
| 2014/0101740 | A1 * | 4/2014 | Li | G06F 21/32 726/7 |
| 2014/0282098 | A1 * | 9/2014 | McConnell | G06Q 10/0639 715/753 |
| 2015/0006492 | A1 * | 1/2015 | Wexler | G06F 17/30554 707/694 |

* cited by examiner

*Primary Examiner* — Christopher Revak
(74) *Attorney, Agent, or Firm* — Krishnendu Gupta; Jason A. Reyes

(57) ABSTRACT

There is disclosed herein techniques for use in skill-based authentication. The techniques comprise determining a skill associated with a user. Also, the techniques comprise providing a user challenge based on the skill. Further, the techniques comprise receiving a user response to the user challenge. Additionally, the techniques comprise determining whether to authenticate the user based on the user response.

13 Claims, 4 Drawing Sheets

SKILL-BASED AUTHENTICATION

TECHNICAL FIELD

The present invention relates to the field of authentication. More specifically, the present invention relates to a method, an apparatus, and a computer program product for use in skill-based authentication.

BACKGROUND OF THE INVENTION

Generally, security systems employ an identity-based authentication scheme in order to verify the identity of a user seeking access to a protected resource (e.g., a computerized resource). One goal of such security systems is to accurately determine identity so that an unauthorized party cannot gain access. Security systems can use one or more of several factors, alone or in combination, to authenticate users. For example, security systems can be based on something the user knows, something the user is, or something that the user has.

Examples of something a user knows are a code word, password, personal identification number ("PIN") and the like. One exemplary computer-based method involves the communication of a secret that is specific to a particular user. The user seeking authentication transmits the secret or a value derived from the secret to a verifier, which authenticates the identity of the user. In a typical implementation, a user communicates both identifying information (e.g., a user name) and a secret (e.g., a password) to the verifier. The verifier typically possesses records that associate a secret with each user. If the verifier receives the appropriate secret for the user, the user is successfully authenticated. If the verifier does not receive the correct secret, the authentication fails.

Examples of something the user is include a distinct characteristic or attribute known as a biometric. It will be known by those skilled in the art that a biometric is a unique physical or behavioral characteristic or attribute that can be used to identify a person uniquely. Biometrics that facilitate accurate identification of a person include fingerprinting, facial recognition, retina blood vessel patterns, DNA sequences, voice and body movement recognition, handwriting and signature recognition. In one exemplary method, a verifier typically observes these characteristics before making a decision whether or not to authenticate. The observation of these characteristics is referred to generally as biometric measurement. The verifier then compares the observed characteristics to records of characteristics associated with the user. If the comparison is successful, the verifier grants authentication. Otherwise, authentication is denied.

An example of something a user possesses is a physical or digital object, referred to generally as a token, unique, or relatively unique, to the user. It will be appreciated that possession of a token such as a bank card having certain specific physical and electronic characteristics, for example, containing a specific identification number that is revealed when the token is accessed in a particular manner, can be this type of factor. A token containing a computing device that performs encryption using an encryption key contained in the device would also be regarded as this type of factor. For example, a token could accept user input, which might include a PIN or a challenge value, and provide as output a result encrypted with a secret encryption key stored in the card. A verifier then compares the output to an expected value in order to authenticate the user.

Unfortunately, the above authentication factors do not always provide sufficient means of authentication. It is known that these factors can from time to time be inadvertently obtained by unauthorized parties or fraudsters. For example, a fraudster may illegally obtain a token from a user without user knowledge. The fraudster may subsequently have a time window to fraudulently authenticate under the user's identity before the user notices the missing token. It is, therefore, important to have additional authentication factors that either alone or in combination with the above factors strengthen the authentication process such that the exposure of an authentication factor to a fraudster does not immediately result in a fraudulent transaction.

SUMMARY OF THE INVENTION

There is disclosed a method, comprising: determining a skill associated with a user; based on the skill, providing a user challenge; receiving a user response to the user challenge; and based on the user response, determining whether to authenticate the user.

There is also disclosed an apparatus, comprising: at least one processing device, said at least one processing device comprising a processor coupled to a memory; wherein the apparatus is configured to: determine a skill associated with a user; based on the skill, provide a user challenge; receive a user response to the user challenge; and based on the user response, determine whether to authenticate the user.

There is a computer program product having a non-transitory computer-readable medium storing instructions, the instructions, when carried out by one or more processors, causing the one or more processors to perform a method of: determining a skill associated with a user; based on the skill, providing a user challenge; receiving a user response to the user challenge; and based on the user response, determining whether to authenticate the user.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

The invention as described herein utilizes a skill profile associated with an end user to challenge the user with skill based tests in order to obtain skill points that can be used as a factor in authentication. Skill based tests can relate to a particular subject, such as, logic, math, science, construction, electricity, plumbing, etc. Skill based tests can also be game oriented. Depending on the skill profile, a skill based test can be devised that provides the user with the opportunity to demonstrate their skills. Individual skills, or multiple skills, can be utilized in the test to provide the best opportunity to achieve the skill points required for authentication. Time restrictions can also be used to limit the ability to obtain assistance from other sources.

Advantageously, the skill factor can be devised via interaction with a server based system. Unlike shared secret implementations, a skill based factor has little or no footprint for an attacker to utilize. There is no shared secret. In the event a local authentication is required without the use of a server system, some subset of the skill profile can be loaded on the device and used with an application based skill test to achieve the necessary skill points to generate the skill factor. It should be noted that an authentication policy can be used in order to determine if the skill factor is sufficient for the access requested or if the skill factor should be used in combination with other factors.

Figure 1:
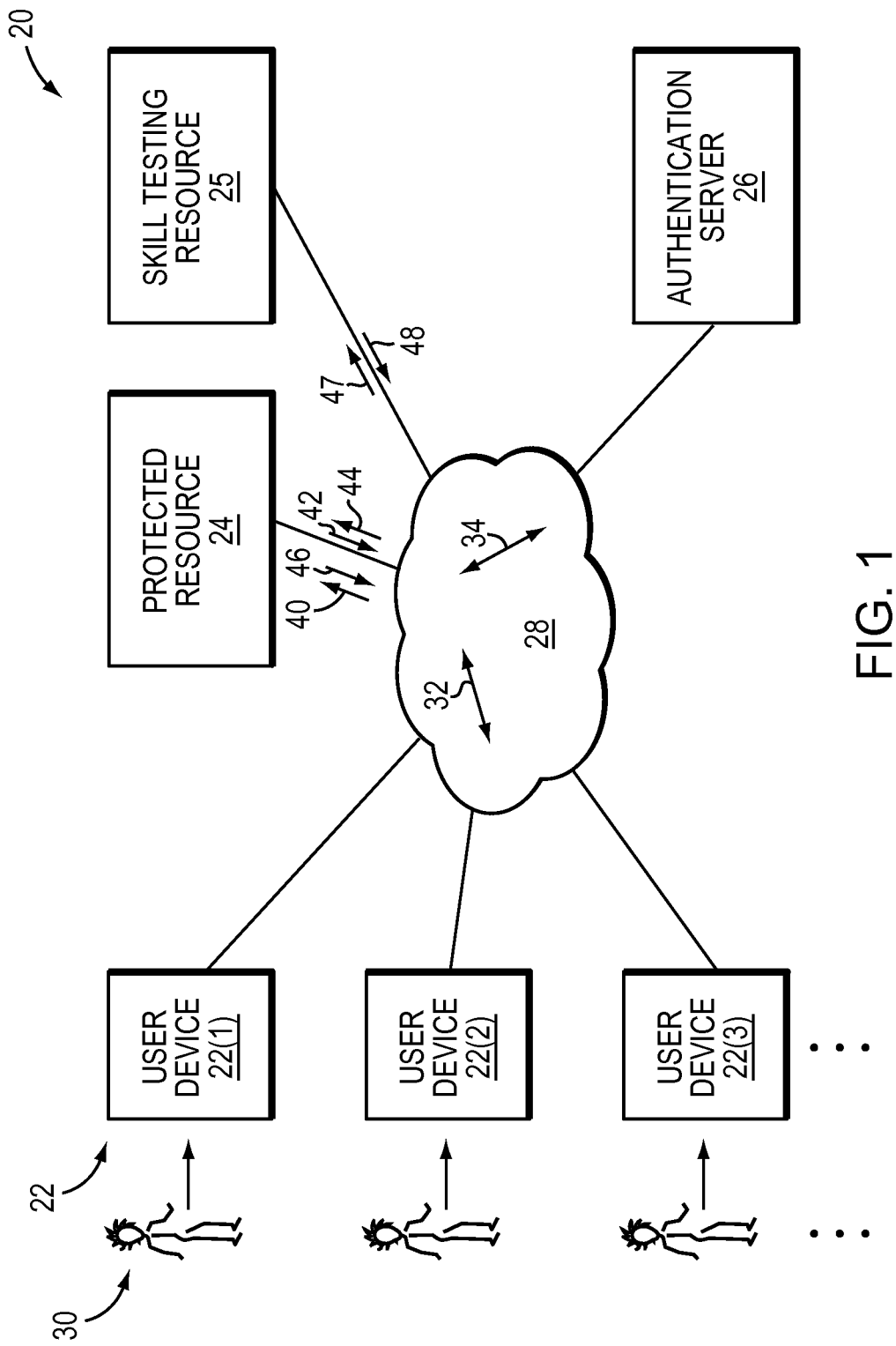
FIG. 1 is a block diagram of an environment for authenticating users.

FIG. 1 shows an environment 20 for authenticating users. The environment 20 includes user devices 22(1), 22(2), 22(3), . . . (collectively, user devices 22), a protected resource 24, a skill testing resource 25, an authentication server 26, and a communications medium 28.

Each user device 22 is an electronic apparatus through which a user 30 is able to communicate with the protected resource 24. Examples of suitable electronic apparatus for the user devices 22 include general purpose computers, laptop computers, portable/wireless devices, and so on.

The protected resource 24 is a resource that grants user access responsive to an authentication process. The protected resource 24 may be an access-controlled application, web site, hardware device, etc. For example, the protected resource 24 may be accessed by communicating with a remote server (not shown) over the communications medium 28.

The skill testing resource 25 is a resource that challenges the user by testing a skill associated with the user 30. In particular, the resource 25 tests a skill at which the user professes to be proficient. For example, the user skill may relate to an online game, a profession, a subject, etc.

The authentication system 26 is a system configured to authentication users 30. In particular, the system 26 is constructed and arranged to receive authentication requests relating to access to the protected resource 24. The authentication system 26 is also constructed and arranged to generate authentication results based at least on a skill associated with the user 30. It should be appreciated that the authentication result can grant or deny access to the protected resource 24. The authentication system 26 also includes a user profile describing characteristics associated with each user 30 (e.g., user skills) of the protected resource 24.

It should be understood that the communications medium 28 is constructed and arranged to convey electronic signals 32, 34 between the various components of the environment 20 effectively and efficiently. Along these lines, the electronic signals may take a variety of forms including electrical signals, optical signals, wireless signals, combinations thereof, and so on. Additionally, the communications medium 28 may implement a variety of protocols such as TCP/IP, UDP, ATM, Ethernet, combinations thereof, and the like. Furthermore, the communications medium 28 may include various components (e.g., cables, switches, gateways/bridges, NAS/SAN appliances/nodes, interfaces, etc.). Moreover, the communications medium 28 is capable of having a variety of topologies (e.g., hub-and-spoke, ring, backbone, multi-drop, point-to-point, irregular, combinations thereof, etc.).

During operation, a user 30 initially attempts to login with the protected resource 24 by providing a login request 40 using a user device 22. The login request 40 may include a variety of identification information entered by the user 30, as well as ancillary information (e.g., a device identifier from the user device 22, a geographic location, etc.). The protected resource 24 receives the login request 40 and sends a request transmission 42 through the communications medium 28 to the authentication server 26 directing the authentication server 26 to perform an authentication operation.

Next, the authentication server 26 performs the authentication operation by requesting 47 the skill testing resource 25 to test a skill associated with the user. The skill testing resource 25 tests the skill of the user and returns 48 a skill assessment to the authentication server 26. The server 26 then returns a response transmission 44 to the protected resource 24 through the communications medium 28. The response transmission 44 indicates whether the protected resource 24 should grant access to the user 30 using the particular user device 22. The protected resource 24 then sends a login response 46 back to the user device 22 either allowing or disallowing further access. Further details will now be provided with reference to FIG. 2.

Figure 2:
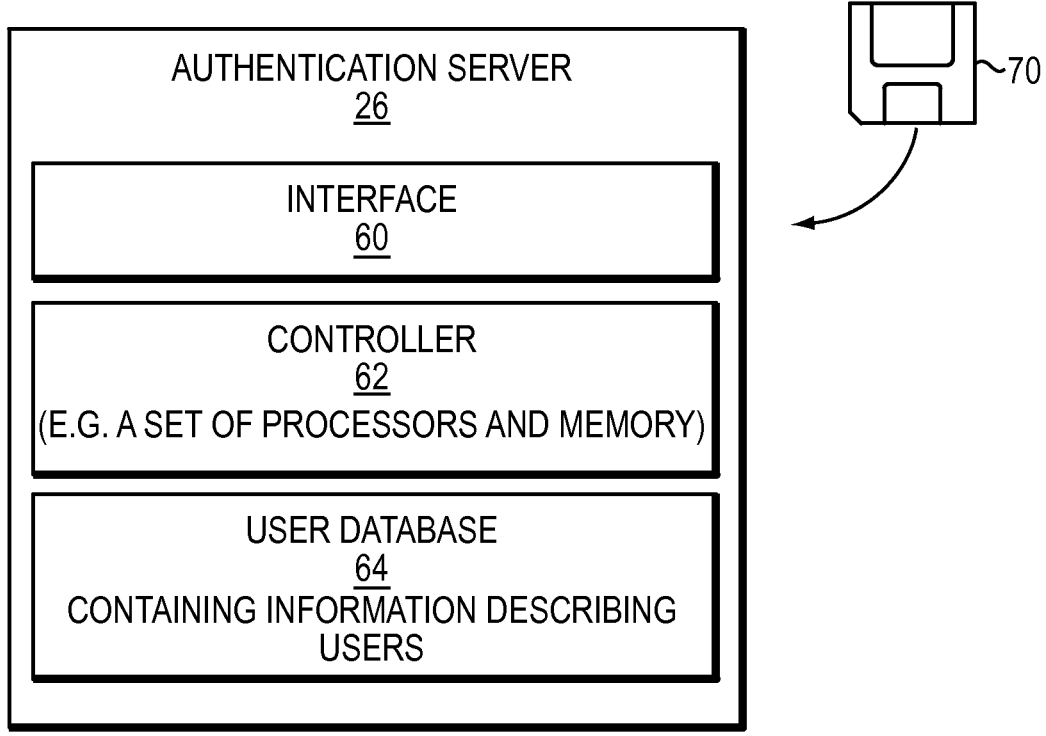
FIG. 2 is a block diagram of an authentication server of the environment of FIG. 1.

FIG. 2 shows certain details of the authentication server 26. The authentication server 26 includes an interface 60, a controller 62, and a user database 64. The interface 60 enables the authentication server 26 to receive input and provide output. The user database 64 is constructed and arranged to store information describing users 30. For example, the user database 64 may identify skills at which each of the users 30 are proficient. The controller 62 is constructed and arranged to access the information in the user database 64 and perform authentication operations. It will be appreciated that such authentication operations may utilize certain operating parameters for effective risk analysis. This will be described in further detail below.

During operation, the database 64 in the server 26 is configured to store a user profile for each user 30 that includes, among other things, an indication of a skill associated with the respective users. When a particular user 30 submits a login request, and the server 26 in turn receives a request transmission 42, the server 26 accesses the database 64, determines the skill associated with the user, and directs the skill testing resource 25 to test the skill associated with the user 30. An example of a user skill includes a skill in connection with a game. In this particular example, if the user plays the game, the skill testing resource 25 can assess the skill of the user 30 in connection with the game and return a skill assessment (e.g., a score) to the server 26. Once the server 26 receives the skill assessment, the server 26 performs a risk analysis. In this situation, the server 26 comprises operating parameters that include a predefined threshold such that a score above the threshold is indicative of a risky situation and a score below the threshold is indicative of a non-risky situation. Depending on the riskiness, the server 26 either denies or grants access to the protected resource 24.

It should be appreciated that in other embodiments the server 26 may consider factors other than skill when determining whether to deny or approve access to the protected resource 24. For example, the server 26 may generate a user attribute risk score indicating an amount of risk based on a comparison between earlier stored user attributes (e.g., location and address data) and currently received user attributes. In this situation, the operating parameters may include a predefined user attribute threshold so that a user attribute risk score above the user attribute threshold indicates a likely fraudster situation while a user attribute risk score below the user attribute threshold indicates an unlikely fraudster situation. In some arrangements, the user attribute risk score is an aggregation of individual weight risk analysis results from comparisons of individual attribute factors (e.g., device address, ISP address, geographic location, tracking cookie information, etc.).

Similarly, the server 26 may generate a user behavior risk score indicating an amount of risk based on a comparison between earlier stored user behavior information and recently received user behavior information (e.g., game play times and game play speed information, etc.). In this situation, the operating parameters may include a predefined user behavior threshold so that a user behavior risk score above the user behavior threshold indicates a likely fraudster situation while a user behavior risk score below the user behavior threshold indicates an unlikely fraudster situation. In some arrangements, the user behavior risk score is an aggregation of individual weight risk analysis results from comparisons of individual behavior factors.

In some arrangements, the controller 62 is implemented using a set of processors (e.g., processing boards, a microprocessor, etc.) and memory which may store, among other things, a specialized authentication application. In such arrangements, the controller 62 forms a specialized circuit when executing the specialized authentication application.

It should be understood that the specialized authentication application is capable of being delivered to and installed on the authentication server 26 from a computer program product 70 (illustrated generally by a diskette icon). Such a computer program product 70 includes a non-transitory computer readable storage medium which stores, in a non-volatile manner, instructions for performing the authentication operations. Examples of suitable computer readable storage media include CD-ROM, magnetic disk or tape cartridges, flash memory, disk memory, and the like. In addition to installing the authentication application locally, it should be understood that such specialized software may be made available as a service via the Internet (e.g., SaaS).

Figure 3:
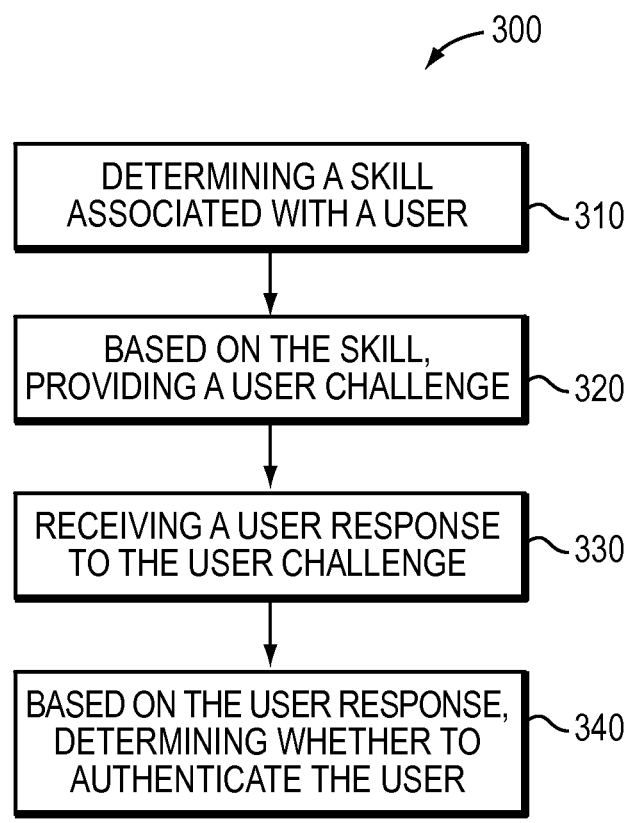
FIG. 3 is a flowchart of a procedure which is performed by the authentication server of FIG. 2.

FIG. 3 is a flowchart of a procedure 300 which is performed by the authentication server 26 of the environment 20 (FIG. 1) for user authentication. In step 310, the server 26 determines a skill associated with a user. As discussed above, the server 26 can determine the skill by accessing the database 64 that contains information describing the user in response to receiving a user request for access to the protected resource 24. For example, the skill may relate to a user proficiency in a subject such as mathematics. Additionally, or alternatively, the skill may relate to a user profession or user vocation, an educational qualification obtained by the user and/or a user hobby (e.g., a game). In at least one embodiment, the skill may be registered by the user at enrolment. For example, the server 26 may receive an indication of at least one skill related to the user at enrolment. Upon receipt, the server 26 may create a skill profile or user profile in connection with the user and store the profile in the database 64.

In step 320, the server 26 provides a user challenge based on the skill. It should be understood that the server 26 may be configured to provide the user challenge directly to the user or indirectly by requesting the skill testing resource 25 to challenge the user as discussed above. Depending on the skill, the user challenge may include a challenge to be solved, an equation to be solved, a formula-based problem to be solved, and/or a game to be played. In other embodiments, the user challenge may include one of an image or a video describing a scenario and a question questioning the scenario. In at least one embodiment, the user challenge may be provided for a predetermined period of time such that a user response can only be provided to the user challenge within the predetermined period of time. The user challenge may also include a plurality of responses, whereby at least one of the responses is the correct response.

In step 330, the server 26 receives a user response to the user challenge. The user response may include a skill assessment of the user skill. As will be appreciated from the foregoing, the user response may be one factor of a set of factors used to determine whether to authenticate the user. The set of factors may include attribute and behavioural factors, as described above, a biometric factor, a knowledge factor, a token passcode factor, etc.

In step 340, the server 26 determines whether to authenticate the user based on the user response. For example, the user response may include a skill assessment in the form of a score that may be compared to a threshold in order to evaluate the risk. On the other hand, the server 26 may have to determine the score in response to receiving the user response. In either event, the server 26 may then compare the score with a threshold in order to ascertain the risk. If the comparison indicates a high risk then authentication may be denied. On the other hand, if the comparison indicates a low risk then authentication may be granted.

In use, a user may identify mathematics, and in particular, calculus as a skill. When attempting to authenticate, the user may then be presented with an integration problem where the user must respond with the correct solution to the problem. The decision whether or not to authenticate the user may be dependent on the response to the problem. In another embodiment, a user may identify plumbing as a skill. When attempting to authenticate, the user may then be presented with images or pictures of common plumbing items or activities and must identify if the correct methods are being employed. In another embodiment, a user may identify a video game as a skill. When attempting to authenticate, the user must play the game in order to confirm the user's skill in the game before authentication is granted. For example, a user may be skilled in the game 'Adventure' popular in the 1980's. As will be known, this game is a screen text based game where descriptions of events and the environment are printed on the screen and the user responds with actions. It should be understood that if you're in a particular location there are some special words (e.g., XYZZY, PLUGH) that allow you to travel to other locations, or others that can attack adversaries, etc. The knowledge of these can be used to assess the skill of a player.

Figure 4:
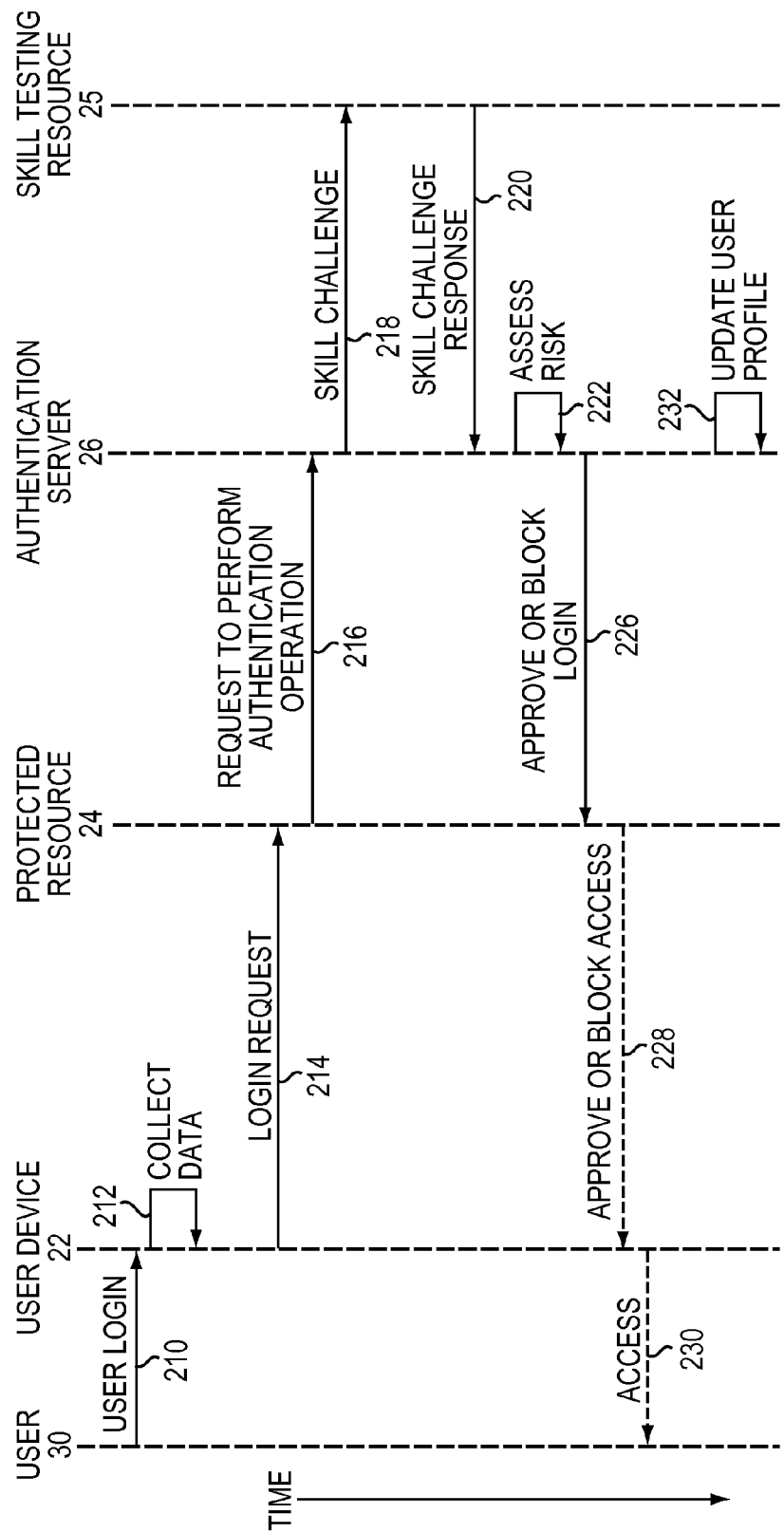
FIG. 4 is a sequence diagram illustrating various communications between components of the environment of FIG. 1 during a user login attempt.

FIG. 4 shows a sequence diagram illustrating communications between certain components of the environment 20 during a user login attempt. Time increases in the downward direction.

Initially, the user 30 operates the user device 22 to send a login request to the protected resource 24 (arrows 210, 212 and 214). The user device 22 includes user device data (e.g., a device identifier, a certificate, a MAC address, location, other formal credentials, etc.) which uniquely identifies the user device 22 (arrow 212). The protected resource 24 then provides an authentication request (arrow 216) to the authentication server 26 perhaps with information such as IP address, ISP information, and information regarding the user's application (e.g., a browser, etc.), which may initially be assessed for risk.

The authentication server 26 is equipped to perform additional authentication operations. As described above, the authentication server 26 requests the skill testing resource 25 (arrow 218) to issue a skill challenge to the user. The skill testing resource 25 returns the user response to the challenge (arrow 220). In some arrangements, it should be appreciated that the skill is user specific such that the user should be proficient in that particular skill.

Next, the authentication server 26 assesses the risk (arrow 222) and makes a decision whether to approve or block the user 30, and sends the result of that decision to the protected resource 24 (arrow 226). Upon receipt of the decision, the protected resource 24 either approves or blocks access to the protected resource 24 (arrows 228 and 230 which are shown as dashed arrows since access may be blocked). Such operation may include creation of a ticket for follow-up by a fraud department.

Additionally, the authentication server 26 updates its records in the user database 64 with data gathered during the authentication process (arrow 232). Such information may include identification information of a new user device 22, a new location, information regarding the skill challenge, and so on.

While the above description describes remote authentication, there is also the possibility that local authentication can be provided by loading a skill profile describing the users skills and the local device can interact with various pictures, videos, etc. on the internet to evaluate the skill.

While various embodiments of the invention have been particularly shown and described, it will be understood by those skilled in the art that various changes in form and details may be made therein without departing from the spirit and scope of the invention as defined by the appended claims.

What is claimed is:

1. A method, comprising:
creating a profile in connection with a user, wherein the profile describes a skill relating to a user proficiency in a subject;
receiving a request from the user to access a protected resource;
in response to receiving the request, determining the skill associated with the user;
based on the skill, providing a user challenge to the user, wherein the user challenge comprises at least one of an equation to be solved and a formula-based problem to be solved by the user, wherein the user challenge is provided for a predetermined period of time such that the user can only respond to the user challenge within the predetermined period of time, wherein the user challenge provided to the user comprises a plurality of responses to the user challenge including a correct response to the user challenge;
receiving a user response from the user to the user challenge; and
based on the user response, determining whether to authenticate the user such that the user can access the protected resource.

2. The method as claimed in claim 1, wherein the skill relates to a user profession or user vocation.

3. The method as claimed in claim 1, wherein the skill relates to an educational qualification obtained by the user.

4. The method as claimed in claim 1, wherein the skill relates to a user hobby.

5. The method as claimed in claim 1, wherein the user challenge comprises a challenge to be solved.

6. The method as claimed in claim 1, wherein the user challenge comprises one of an image or a video describing a scenario and a question questioning the scenario.

7. The method as claimed in claim 1, wherein the user challenge comprises a game to be played.

8. The method as claimed in claim 1, wherein the user response acts as one factor of a set of factors used to determine whether to authenticate the user.

9. The method as claimed in claim 8, wherein the set of factors comprises at least one of a user attribute factor, a user behavioural factor, a user biometric factor, a user knowledge factor, and a token passcode factor.

10. The method as claimed in claim 1, wherein determining whether to authenticate the user comprises determining a score in connection with the user response.

11. The method as claimed in claim 1, wherein determining whether to authenticate the user comprises comparing a score to a threshold.

12. An apparatus, comprising:
at least one processing device, said at least one processing device comprising a processor coupled to a memory;
wherein the apparatus is configured to:
create a profile in connection with a user, wherein the profile describes a skill relating to a user proficiency in a subject;
receive a request from the user to access a protected resource;
in response to receiving the request, determine the skill associated with the user;
based on the skill, provide a user challenge to the user, wherein the user challenge comprises at least one of an equation to be solved and a formula-based problem to be solved by the user, wherein the user challenge is provided for a predetermined period of time such that the user can only respond to the user challenge within the predetermined period of time, wherein the user challenge provided to the user comprises a plurality of responses to the user challenge including a correct response to the user challenge;
receive a user response from the user to the user challenge; and
based on the user response, determine whether to authenticate the user such that the user can access the protected resource.

13. A computer program product having a non-transitory computer-readable medium storing instructions, the instructions, when carried out by one or more processors, causing the one or more processors to perform a method of:
creating a profile in connection with a user, wherein the profile describes a skill relating to a user proficiency in a subject;
receiving a request from the user to access a protected resource;
in response to receiving the request, determining the skill associated with the user;

based on the skill, providing a user challenge to the user, wherein the user challenge comprises at least one of an equation to be solved and a formula-based problem to be solved by the user, wherein the user challenge is provided for a predetermined period of time such that the user can only respond to the user challenge within the predetermined period of time, wherein the user challenge provided to the user comprises a plurality of responses to the user challenge including a correct response to the user challenge;

receiving a user response from the user to the user challenge; and based on the user response, determining whether to authenticate the user such that the user can access the protected resource.

* * * * *